United States Patent
Toniolo et al.

(10) Patent No.: US 12,500,371 B2
(45) Date of Patent: Dec. 16, 2025

(54) SINGLE CONDUCTOR SEALED CONNECTOR FOR HIGH PRESSURE GAS PRESSURE APPLICATIONS

(71) Applicant: Schlumberger Technology Corporation, Sugar Land, TX (US)

(72) Inventors: Julien Toniolo, Houston, TX (US); Jared Mangum, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 243 days.

(21) Appl. No.: 18/319,772

(22) Filed: May 18, 2023

(65) Prior Publication Data

US 2024/0388035 A1   Nov. 21, 2024

(51) Int. Cl.
*H01R 13/52* (2006.01)
*E21B 17/02* (2006.01)

(52) U.S. Cl.
CPC ......... *H01R 13/521* (2013.01); *E21B 17/028* (2013.01)

(58) Field of Classification Search
CPC .. H01R 13/521; H01R 13/504; H01R 13/533; H01R 13/5221; E21B 17/028; B29C 2045/14459; H02G 15/04; H02G 15/013
See application file for complete search history.

(56) References Cited

U.S. PATENT DOCUMENTS

| | | | | |
|---|---|---|---|---|
| 5,344,337 A * | 9/1994 | Ritter | ................... | H01R 13/533 439/447 |
| 2009/0269956 A1 | 10/2009 | Frey | | |
| 2011/0286704 A1 * | 11/2011 | Rubinstein | ........... | G02B 6/3802 385/100 |
| 2015/0111420 A1 * | 4/2015 | Zillinger | ............... | E21B 17/028 29/857 |
| 2015/0255974 A1 | 9/2015 | Burrow | | |
| 2017/0187177 A1 * | 6/2017 | Mangum | ................ | H02G 15/02 |
| 2022/0162917 A1 * | 5/2022 | Flander | ............... | E21B 17/1028 |
| 2022/0268151 A1 * | 8/2022 | Toniolo | ................... | E21B 23/03 |
| 2022/0356768 A1 * | 11/2022 | Flander | ............... | E21B 17/1028 |
| 2024/0388035 A1 * | 11/2024 | Toniolo | ................ | H01R 13/504 |

FOREIGN PATENT DOCUMENTS

CA    2826753 C   *   5/2016   ........... E21B 17/028

* cited by examiner

*Primary Examiner* — Abdullah A Riyami
*Assistant Examiner* — Nader J Alhawamdeh
(74) *Attorney, Agent, or Firm* — Jeffrey D. Frantz

(57) ABSTRACT

Embodiments presented provide for a sealed connector for use in high gas pressure applications. The sealed connector may provide for electrical signals and power to be transmitted along a cable to a downhole apparatus, such as those used in hydrocarbon recovery operations. The sealed connector includes a body having a first body portion and a second body portion, where the first body portion includes an interior cavity having a connection portion and a sealing surface, and the second body portion is comprised of an elastomer having a bore. The elastomer of the second body portion is bonded to the first body portion, and an insert is disposed within the body. A wire is configured to extend through the bore of the second body portion, the elastomer of the second body portion seals against the wire, and the wire is coupled to the insert.

15 Claims, 4 Drawing Sheets

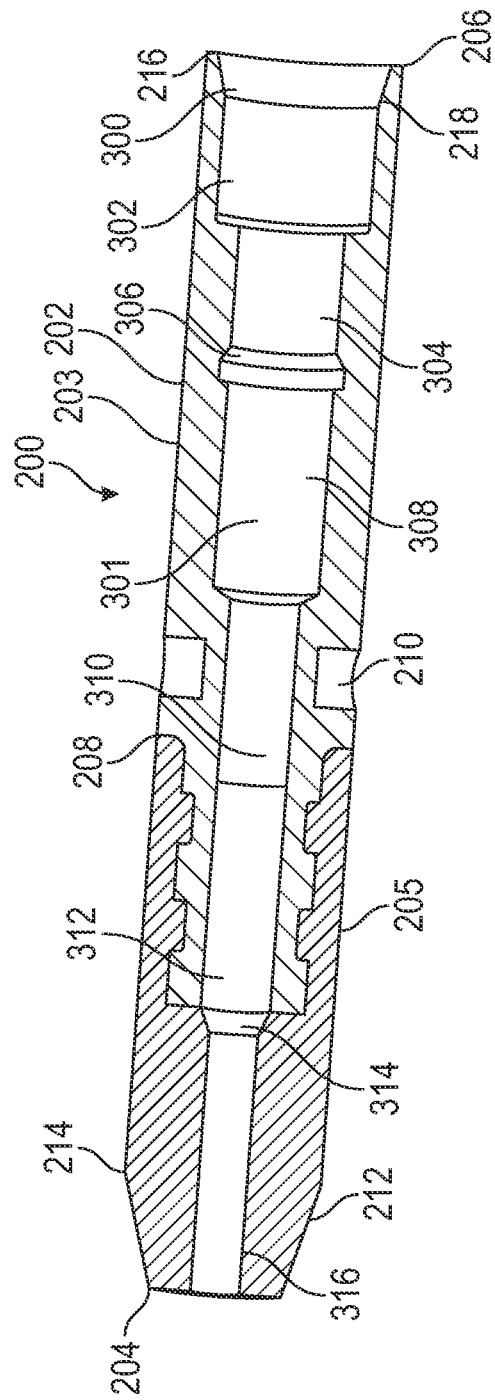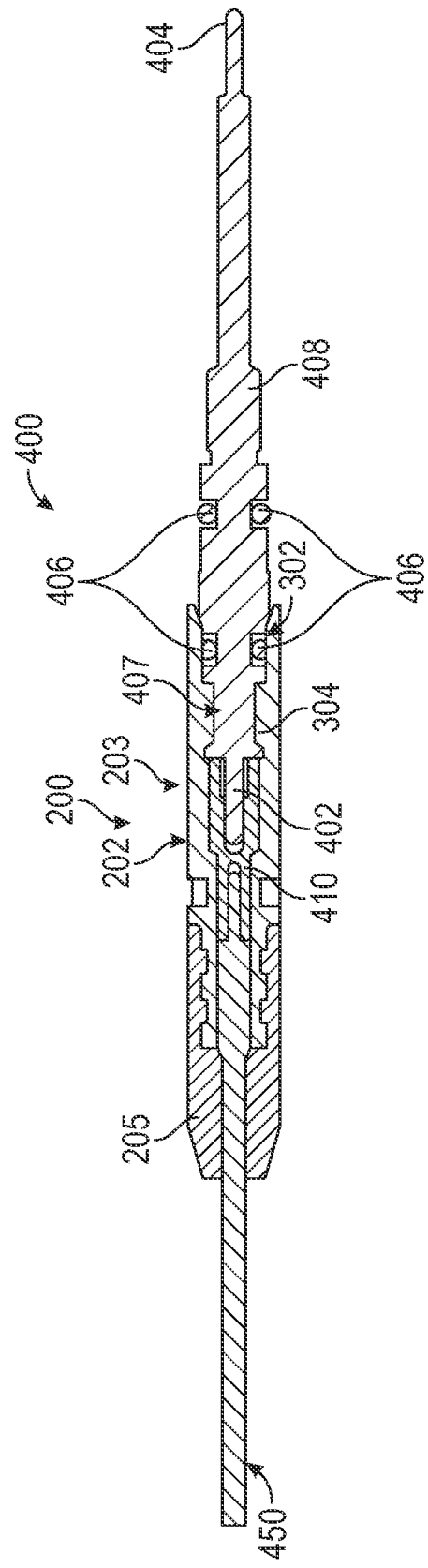

SINGLE CONDUCTOR SEALED CONNECTOR FOR HIGH PRESSURE GAS PRESSURE APPLICATIONS

CROSS-REFERENCE TO RELATED APPLICATIONS

None.

FIELD OF THE DISCLOSURE

Aspects of the disclosure relate to electrical connectors. More specifically, aspects of the disclosure relate to electrical connectors that may be used in high gas environments, such as, for example, within a wellbore of a hydrocarbon recovery operation.

BACKGROUND

In the field of downhole drilling, measurements, or intervention operations, there is a need for power transmission and data communication from the surface to the subsurface as well as from the subsurface to the surface.

Conventionally, bi-directional communication can be achieved with mud pulse telemetry where pressure waves carry the information along the drilling fluid column. Electromagnetic telemetry may also be used where electromagnetic waves carry the information through the formation. A further method may use a cabled electrical telemetry where electric signals circulate along the conductors of the cable. Power transmission can be achieved through hydraulic power and turbine installed through the flow downhole, or through electrical connection, with a generator at the surface.

Because of its relative simplicity and cost efficiency, the cable used in cabled electrical telemetry, runs between the surface and subsurface equipment. Cabled electrical telemetry is often the selected option when average power and high data rates are required. Cables, however, have limitations, among which are the power that can be transmitted over long distance or their ability to function in a high gas environment. As is known, gas can be produced from the formation.

Typically, the conductors of the cables are most often stranded copper-based wires, with gaps between the strands, and they are insulated using polymers like Polytetrafluoroethylene (PTFE), Perfluoroalkoxy alkanes (PFA), or Methylfluoroalkoxy (MFA), that all exhibit high rates of gas permeation. This environment results in gases diffusing radially in the conductor and flowing axially along the conductors, between the strands. Gas is therefore found at the ends of the conductors, where the conductors are electrically connected to the equipment.

At the downhole end of the conductors, the electrical connection must be maintained as well as the isolation with respect to the environment. The common method to achieve the electrical continuity is crimping the conductors to a socket or pin that is in contact with an electrical terminal of the piece of equipment. The common method to achieve the electrical insulation is to slide a liner made of PTFE over the socket or pin and then slide a separate elastomer 'boot' over the liner made of PTFE to seclude the downhole fluids from the electrical connection. An example of a conventional electrical connector is illustrated in FIG. 1.

In these conventional apparatus, the boots, made of elastomer, for example fluorocarbon-based fluoroelastomer material FKM or perfluoroelastomeric compounds FFKM, have two (2) sealing areas on either end. One seals on the wire insulation. The second one seals on the terminal. Due to assembly constraints, typical construction techniques provide for boots to be slid over the wire and terminal, with seal being achieved only due to squeezing the elastomer onto the wire insulator. The boots themselves; however, are also subjected to gas permeation.

The consequence of the gas migrating inside the boot, at the interface with the terminal and the boot, is that when the external pressure decreases, the volume of the gas inside the boot wall and at the interface expands and has the following consequences, such as boots can 'pop off', creating loss of insulation and continuity.

In other instances, boots can blister due to the gas not having enough time to permeate out of the boot wall. This is commonly known as explosive decompression, or rapid gas decompression.

There is a need to provide an apparatus that is easy to install and operate for field operators in high gas environments.

There is a further need to provide apparatus and methods that do not have the drawbacks discussed above, namely blistering or explosive decompression.

There is a still further need to reduce economic costs associated with operations and apparatus described above with conventional tools such that electrical connections do not fail in high gas environments.

There is also a need to effectively connect electrical equipment in high gas environments that is safe and effective for field personnel.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

Embodiments of the disclosure, provided in the claims, will be recited. In one embodiment, the arrangement may comprise a body having a first body portion and a second body portion. The first body portion includes an internal cavity having a connection portion and a sealing surface. The second body portion is comprised of an elastomer having a bore and the second body portion is bonded to the first body portion. A wire is configured to extend through the bore of the second body portion. The arrangement may also further comprise an insert placed within the body, the insert configured to transmit electrical signals and energy. Further, the wire is configured to be coupled to the insert.

Additionally, in one or more embodiments, the arrangement may also comprise a second body with a first body portion and a second body portion, wherein the first body portion of the second body has a connection portion and a sealing surface. The second body portion of the second body is comprised of an elastomer having a bore, and the second body portion of the second body is bonded to the first body portion of the second body. A second wire is configured to extend through the bore of the second body portion of the second body. The arrangement may also comprise a second insert placed within the second body, the second insert configured to transmit electrical signals and energy. Further, the second wire is configured to be coupled to the second insert.

Furthermore, in one or more embodiments, the arrangement may also comprise a terminal with a first end penetrating into the internal cavity of the first body portion of the first body. The terminal includes a connection portion and a seal portion on the first end, wherein the terminal is coupled to the first body by way of the connection portion of the first body portion of the first body and the connection portion of the terminal, and wherein the seal portion of the terminal is configured to seal against the sealing surface of the first body portion of the first body. Additionally, in one or more embodiments, the terminal includes a second end penetrating into the internal cavity of the first body portion of the second body. The terminal further includes a second connection portion and a second sealing surface on the second end, wherein the terminal is coupled to the second body by way of the connection portion of the first body portion of the second body and the second connection portion of the terminal, and wherein the second seal portion of the terminal is configured to seal against the sealing surface of the first body portion of the second body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

FIG. 3 is a cross-sectional view of the embodiment of FIG. 2.

FIG. 4 is a terminal that may be used with the embodiment of FIG. 2.

Figure 1:
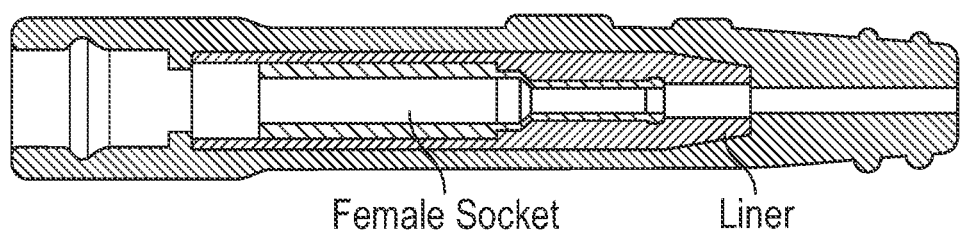
FIG. 1 is a conventional female socket and liner for an electrical connection used in high gas environments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2:
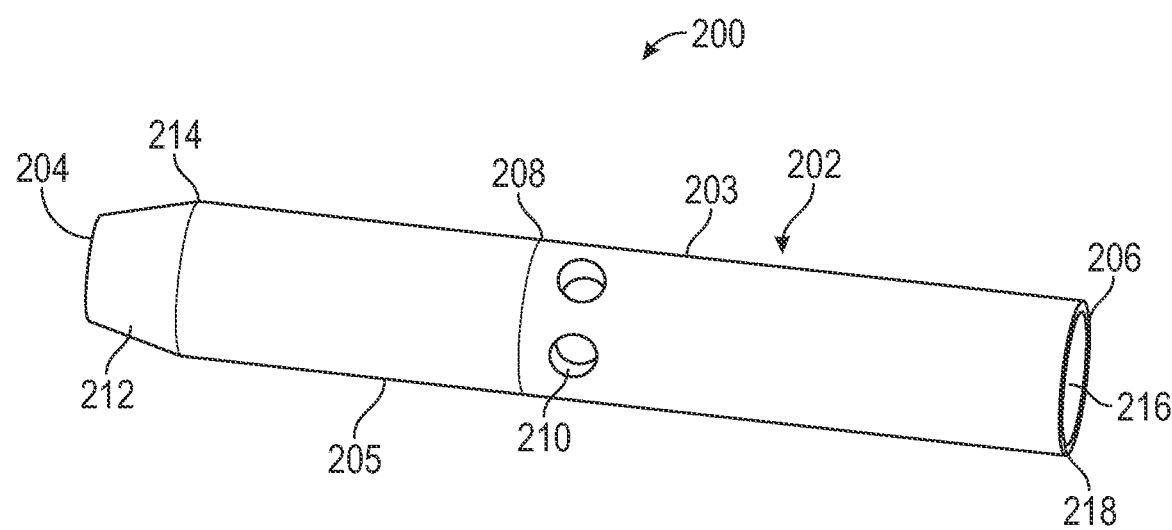
FIG. 2 is a side view of one example embodiment of the disclosure.

Referring to FIG. 2, aspects of the disclosure provide a multi-material boot 200. The boot 200 provides features for preventing the boot 200 from being disconnected from attached equipment due to gas expansion. In some aspects of the disclosure, a thread is provided for the connection. Aspects of the disclosure also provide a wire seal in the form of an elastomer bonded onto the plastic section of the boot that features a female thread. In some aspects, the threaded end has an O-ring seal. The O-ring seal may be a single seal or there may be a double O-ring seal. The overall seal is designed to allow venting/outgassing with an extended creepage path that will only have minimum impact on insulation.

The boot 200 may have a body 202. The body 202 may be a two-part joined unit that has a first end 204 and a second end 206. A connection 208 may connect the two portions of the body 202. The body 202 is provided with a second end diameter 206 to allow connection of a wire 450, illustrated in FIG. 4, within the boot 200. In embodiments, the wire may be a typical insulated copper wire. In other embodiments, different conductive materials may be used. The boot 200 is also provided with an end thickness 218 for protection of the wire connected within the boot 200. The thickness 218 may be varied according to the amount of protection needed. Near the first end 204, the boot 200 includes a frustoconical portion 212. The frustoconical portion 212 extends from an interface plane 214 on the body 202. As illustrated, 216 is an internal diameter of the boot 200.

A series of ports 210 may extend inwardly from an outer diameter of a first body portion 203 of the body 202. In the illustrated embodiment, six ports are provided. In embodiments, the series of ports 210 may be bored into the body 202. Various embodiments are possible wherein these embodiments may have lesser or greater numbers of ports 210. The ports 210 are shown as round in FIG. 2; however, other configurations are possible including slits, square, rectangular, hexagonal, or other more complex geometries. In one or more embodiments, the ports 210 may be configured such that torque may be applied to the boot 200 during assembly. In embodiments, a first body portion 203 may be configured of a plastic material to provide for insulation. The plastic can be, but not limited to, polyether ether ketone (PEEK), polyetherketone (PEK), or other materials. In further embodiments, a second body portion 205 may be configured from a bonded elastomer. The elastomer can be, but not limited to, fluorinated hydrocarbons (FKM), perfluoroelastomer (FFKM), polypropylene rubber (FEPM), copolymers of tetrafluoroethylene and propylene (AFLAS). In embodiments, the elastomer may have enhanced gas decompression properties. The elastomer of the second body portion 205 may be bonded to the first body portion 203. The bonding can be, but is not limited to, overmolding or adhesive types of bonding. Further, in embodiments, the second body portion 205 may be bonded to an outer surface of the first body portion 203.

Referring to FIG. 3, a cross-section of the boot 200 is illustrated. In this cross-sectional portion, the boot 200 has a complex geometry that allows for secure holding of connected equipment. In some embodiments, the connected equipment may be a similar second boot that is connected through a terminal 400, such as illustrated in FIG. 4. From the second end 206, the first body portion 203 may include an interior cavity 301. The interior cavity 301 has, extending from the second end 206, a frustoconical entrance 300, a sealing surface 302, a connection portion 304, an expanded portion 306, a central portion 308, a reduced diameter tube 310 and a connector tube 312. Further, the second body portion 205 may include a bore 316 having a frustoconical portion 314, which may be adjacent to the connector tube 312 of the interior cavity 301 of the first body portion 203. In one or more embodiments, the connection portion 304 may be threaded to allow for mechanical retention of a terminal 400, illustrated in FIG. 4, to be secured. In other embodiments, different mechanical connections besides a threaded portion may be provided. By way of example, in one or more embodiments, instead of the connection portion 304 being threaded, the connection portion 304 may instead include mechanical connections such as a collet or ratchet design.

Referring to FIG. 4, a terminal 400 is illustrated, connected to the boot 200 of FIG. 2. An insert 410 may be placed within the body 202 of the boot 200, and a wire 450 may be coupled to the insert 410. In one or more embodiments, the wire 450 may be coupled to the insert 410 by being crimped within the insert 410. Terminal 400 may be mechanically coupled to the connection portion 304 of the first body portion 203 of the body 202 by way of a connection portion 407 of the terminal 400. In one or more embodiments, the terminal 400 may be threadably coupled to the connection portion 304 of the boot 200. The first end 402 may be pushed into the insert 410 placed within the body 202 prior to insertion. In other embodiments, the terminal 400 may be coupled to the boot 200 such that the first end 402 contacts the insert 410. The insert 410 may also be placed within the body 202 upon manufacturing to provide a snug connection. In other embodiments, the insert 410 may be crimped to the wire 450 after the wire 450 has been inserted through the boot 200 and then the insert 410 may be inserted into the interior cavity 301 of the first body portion 203 of the boot 200. Further, the insert 410 may be electrically conductive to allow signals and or electrical power to transmit from the wire placed in the boot 200 to the insert 410 and to the terminal 400. When the terminal 400 is installed within the boot 200, a seal portion 406 is provided to provide a secure seal against a sealing surface 302 of the boot 200. As illustrated, in one or more embodiments, the terminal 400 may be a two ended terminal wherein a second end 404 may be configured to engage an electrical contact within a mating part (not shown). In one or more embodiments, the mating part may be a second boot, which may be identical or substantially similar to the boot 200 described above. The terminal 400 may include a second seal portion 406 to provide a secure seal within the mating part. Further, the terminal 400 may include a second connection portion 408, which is configured to mechanically couple the terminal 400 to the mating part.

Figure 5A:
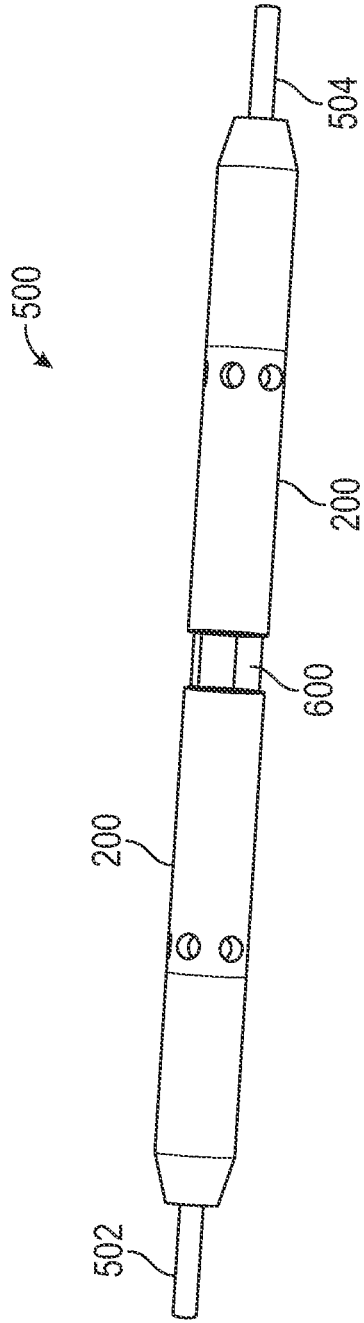
FIG. 5A is an example embodiment of a connection arrangement in another example embodiment of the disclosure.
Figure 5B:
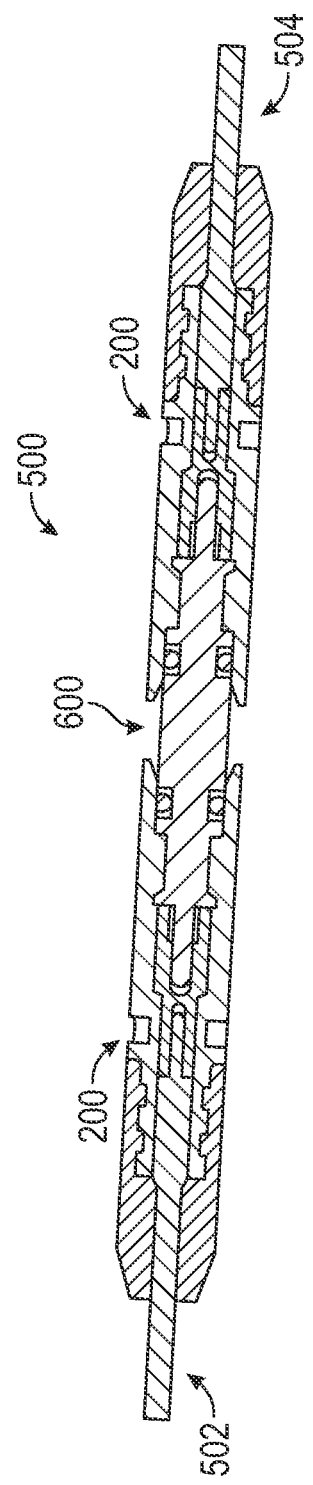
FIG. 5B is a cross-sectional view of the connection arrangement of FIG. 5A.

Referring to FIGS. 5A and 5B, a connection arrangement 500 is shown. In the connection arrangement 500, two boots 200 may be screwed on a terminal 600. In one or more embodiments, the overall configuration may be configured such that it does not slip off the terminal due to high gas pressure environments. In one or more embodiments, the connection portions of the respective boots 200 and the terminal 600 may be threaded portions. Further, the threaded portions of one of the boots 200 may be left handed while the threaded portion of the other boot 200 is right handed such that the terminal 600 may be torqued in one direction to bring both boots 200 closer together and in the other direction to separate the boots 200 from the terminal 600. In one or more embodiments, a first wire or cable 502 may extend into a first boot 200, and the terminal 600 allows for connection to a second wire or cable 504 that may extend from a second boot 200.

Figure 6:
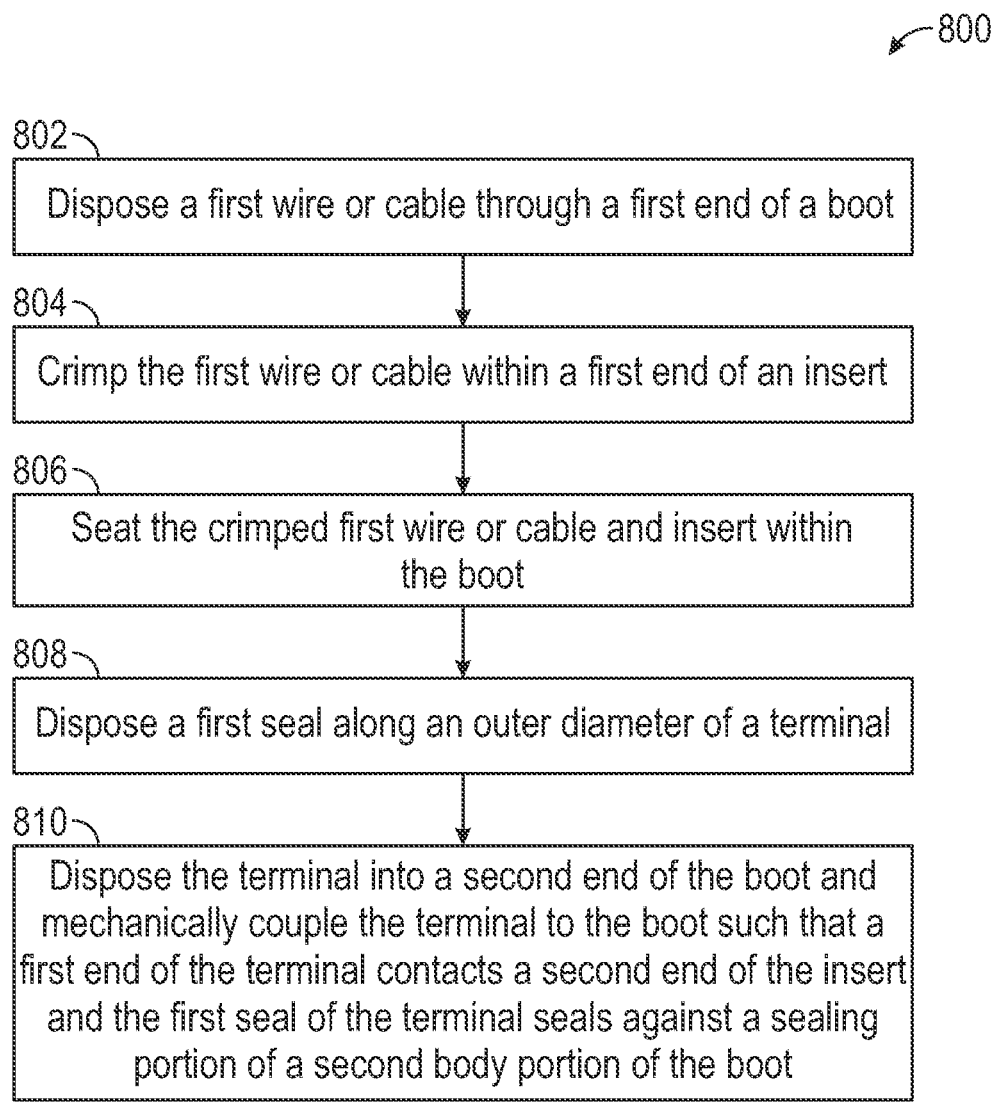
FIG. 6 is a flow diagram of a method of assembling a connection arrangement according to one or more embodiments of the present disclosure.

FIG. 6 illustrates a method 800 of assembling a connection arrangement according to one or more embodiments of the present disclosure. Initially, step 802 of the method 800 may include disposing a first wire or cable through a first end of a boot. In one or more embodiments, disposing the first wire or cable into the boot may include disposing the first wire or cable through a bore within a second body portion of the boot, where the second body portion of the boot is comprised of an elastomer. At step 804, the first wire or cable may be crimped within a first end of an insert. Further, at step 806, the crimped first wire or cable and insert may be seated within the boot. Furthermore, at step 808, a first seal may be disposed along an outer diameter of a terminal. Lastly, at step 810, the terminal may be disposed into a second end of the boot and mechanically coupled to the boot such that a first end of the terminal contacts a second end of the insert. In one or more embodiments, mechanically coupling the terminal to the boot may include coupling a connection portion of the first body portion of the boot to a connection portion of the terminal. In further embodiments, the method 800 may further include repeating all of the previous steps in order to couple the terminal to a second boot such that a second end of the terminal is disposed within and contacts a second end of a second insert which is crimped to a second wire or cable.

As illustrated, 2 boots 200 can be mated to 1 terminal 400, 600, where the terminal has one right hand thread on one end and one left hand thread on the other end and the first boot a left hand thread and the second boot a right hand thread for an 'inline connection' that does not require to twist the connected wires with respect to each other.

In embodiments, the terminal 400, 600 may be a high-pressure feedthrough or a low pressure connector. The terminal 400, 600 may feature a seal section (for electrical insulation), a threaded section (for mechanical connection), and a metallic conductive section as well as two mating surfaces.

In embodiments, an electrical contact is established through crimping or soldering to the wire and is assembled such that it is axially constrained between the boot 200 and the terminal 400, 600, and radially constrained by the body portion 203 of the boot 200.

Embodiments of the disclosure, provided in the claims, will be recited. In one embodiment, a boot for establishing a sealed connection to a wire in a high-pressure gas environment is disclosed. The boot may comprise a body having a first body portion and a second body portion, wherein the first body portion includes an interior cavity having a connection portion and a sealing surface, wherein the second body portion is comprised of an elastomer having a bore, wherein the elastomer of the second body portion is bonded to the first body portion, wherein the wire is configured to extend through the bore of the second body portion, and wherein the elastomer of the second body portion is configured to seal against the wire. The boot may also include an insert disposed within the body, the insert configured to transmit electrical signals and energy, wherein the wire is configured to be coupled to the insert.

In another example embodiment, the boot may be configured wherein the first body portion is made of plastic.

In another example embodiment, the boot may be configured wherein the plastic is one of a polyether ether ketone and a polyetherketone.

In another example embodiment, the boot may be configured where the elastomer is made of one of fluorinated hydrocarbons, perfluoroelastomer, polypropylene rubber and copolymers of tetrafluoroethylene and propylene.

In another example embodiment, the boot may be configured where the elastomer of the second body portion is bonded to an exterior of the first body portion.

In another example embodiment, the boot may be configured where the elastomer of the second body portion is bonded to the first body portion by one of an overmolding type of bonding or an adhesive type of bonding.

In another example embodiment, the boot may be configured where the connection portion includes one of a threaded portion, a collet design, or a ratchet design.

In another example embodiment, an arrangement for establishing a sealed connection to a wire in a high-pressure gas environment is disclosed. In this configuration, the arrangement may comprise a body having a first body portion and a second body portion, wherein the first body portion includes an interior cavity having a connection portion and a sealing surface, wherein the second body portion is comprised of an elastomer having a bore, wherein the elastomer of the second body portion is bonded to the first body portion, wherein the wire is configured to extend through the bore of the second body portion, and wherein the elastomer of the second body portion is configured to seal against the wire. The arrangement further comprises an insert disposed within the body, the insert configured to transmit electrical signals and energy, wherein the wire is configured to be coupled to the insert. Additionally, the arrangement comprises a terminal penetrating into the interior cavity of the body, wherein the terminal includes a connection portion and a seal portion, wherein the terminal is coupled to the body by way of the connection portion of the first body portion and the connection portion of the terminal, and wherein the seal portion of the terminal is configured to seal against the sealing surface of the first body portion.

In another example embodiment, the arrangement may be configured wherein the first body portion is made of plastic.

In another example embodiment, the arrangement may be configured wherein the plastic is one of a polyether ether ketone and a polyetherketone.

In another example embodiment, the arrangement may be configured wherein the elastomer is made of one of fluorinated hydrocarbons, perfluoroelastomer, polypropylene rubber and copolymers of tetrafluoroethylene and propylene.

In another example embodiment, the arrangement may be configured wherein the second body portion is bonded to an exterior of the first body portion.

In another example embodiment, the arrangement may be configured wherein the elastomer of the second body portion is bonded to the first body portion by one of an overmolding type of bonding or an adhesive type of bonding.

In another example embodiment, the arrangement may be configured wherein, when the terminal is coupled to the body, a first end of the terminal contacts the insert.

In another example embodiment, the arrangement may further comprise a second body having a first body portion and a second body portion, wherein the first body portion of the second body includes an interior cavity having a connection portion and a sealing surface, wherein the second body portion of the second body is comprised of an elastomer having a bore, wherein the elastomer of the second body portion of the second body is bonded to the first body portion of the second body, wherein a second wire is configured to extend through the bore of the second body portion of the second body, and wherein the elastomer of the second body portion of the second body is configured to seal against the second wire. Further, the arrangement may comprise a second insert disposed within the second body, the second insert configured to transmit electrical signals and energy, wherein the second wire is configured to be coupled to the second insert, wherein the terminal penetrates into the interior cavity of the second body, wherein the terminal includes a second connection portion and a second seal portion, wherein the terminal is coupled to the second body by way of the connection portion of the first body portion of the second body and the second connection portion of the terminal, wherein the second seal portion of the terminal is configured to seal against the sealing surface of the first body portion of the second body, and wherein, when the terminal is coupled to the second body, a second end of the terminal contacts the second insert.

In another example embodiment, a method comprises disposing a first wire through a first end of a boot, crimping the first wire within a first end of an insert, seating the crimped first wire or cable and insert within the boot, disposing a first seal on an outer diameter of a terminal, disposing the terminal into a second end of the boot, and mechanically coupling the terminal to the boot such that a first end of the terminal contacts a second end of the insert and the first seal of the terminal seals against a sealing surface of a first body portion of the boot.

In another example embodiment, disposing the first wire or cable into the boot comprises disposing the first wire through a bore within a second body portion of the boot, wherein the second body portion of the boot is comprised of an elastomer.

In another example embodiment, mechanically coupling the terminal to the boot comprises coupling a connection portion of the first body portion of the boot to a connection portion of the terminal.

In another example embodiment, the method further includes that the elastomer of the second body portion of the boot is bonded to the first body portion of the boot.

In another example embodiment, the method includes that the elastomer of the second body portion is bonded to the first body portion by one of an overmolding type of bonding or an adhesive type of bonding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An arrangement for establishing a sealed connection to a wire in a high-pressure gas environment, comprising:
   a body having a first body portion and a second body portion, wherein the first body portion includes an interior cavity having a connection portion and a sealing surface, wherein the second body portion is comprised of an elastomer having a bore, wherein the elastomer of the second body portion is bonded to the first body portion, wherein the wire is configured to extend through the bore of the second body portion, and wherein the elastomer of the second body portion is configured to seal against the wire; and
   an insert disposed within the body, the insert configured to transmit electrical signals and energy, wherein the wire is configured to be coupled to the insert; and
   a terminal penetrating into the interior cavity of the body, wherein the terminal includes a connection portion and a seal portion, wherein the terminal is coupled to the body by way of the connection portion of the first body portion and the connection portion of the terminal, and wherein the seal portion of the terminal is configured to seal against the sealing surface of the first body portion.

2. The arrangement according to claim 1, wherein the connection portion of the first body portion includes one of a threaded portion, a collet design, or a ratchet design.

3. The arrangement according to claim 1, wherein the first body portion is made of plastic.

4. The arrangement according to claim 3, wherein the plastic is one of a polyether ether ketone and a polyetherketone.

5. The arrangement according to claim 1, wherein the elastomer is made of one of fluorinated hydrocarbons, perfluoroelastomer, polypropylene rubber, and copolymers of tetrafluoroethylene and propylene.

6. The arrangement according to claim 1, wherein the elastomer of the second body portion is bonded to an exterior of the first body portion.

7. The arrangement according to claim 6, wherein the elastomer of the second body portion is bonded to the first body portion by one of an overmolding type of bonding or an adhesive type of bonding.

8. The arrangement according to claim 1, wherein, when the terminal is coupled to the body, a first end of the terminal contacts the insert.

9. The arrangement according to claim 1, wherein the arrangement further comprises:
   a second body having a first body portion and a second body portion, wherein the first body portion of the second body includes an interior cavity having a connection portion and a sealing surface, wherein the second body portion of the second body is comprised of an elastomer having a bore, wherein the elastomer of the second body portion of the second body is bonded to the first body portion of the second body, wherein a second wire is configured to extend through the bore of the second body portion of the second body, and wherein the elastomer of the second body portion of the second body is configured to seal against the second wire; and
   a second insert disposed within the second body, the second insert configured to transmit electrical signals and energy, wherein the second wire is configured to be coupled to the second insert, wherein the terminal penetrates into the interior cavity of the second body, wherein the terminal includes a second connection portion and a second seal portion, wherein the terminal is coupled to the second body by way of the connection portion of the first body portion of the second body and the second connection portion of the terminal, wherein the second seal portion of the terminal is configured to seal against the sealing surface of the first body portion of the second body, and wherein, when the terminal is coupled to the second body, a second end of the terminal contacts the second insert.

10. A method for establishing a sealed connection to a wire in a high-pressure gas environment, the method comprising:
   disposing the wire through a first end of a boot, wherein the boot includes a body having a first body portion and a second body portion, wherein the first body portion includes an interior cavity having a connection portion and a sealing surface, wherein the second body portion is comprised of elastomer having a bore, wherein the elastomer of the second body portion is bonded to the first body portion, wherein the disposing includes extending the wire through the bore within the second body portion, and wherein the second body portion is configured to seal against the wire;
   crimping the wire within a first end of an insert such that the wire is coupled to the insert, wherein the insert is configured to transmit electrical signals and energy;

seating the crimped wire and insert within the body of the boot;

disposing a seal on an outer diameter of a terminal, wherein the terminal includes a connection portion and a seal portion;

disposing the terminal into a second end of the boot such that the terminal penetrates into the interior cavity of the first body portion; and mechanically coupling the terminal to the body of the boot such that a first end of the terminal contacts a second end of the insert and the seal of the terminal seals against the sealing surface of the first body portion of the body, wherein the mechanically coupling the terminal to the body of the boot includes coupling the connection portion of the first body portion to the connection portion of the terminal.

11. The method according to claim 10, wherein the elastomer of the second body portion is bonded to the first body portion by one of an overmolding type of bonding or an adhesive type of bonding.

12. The method according to claim 10, wherein the first body portion is made of plastic.

13. The method according to claim 12, wherein the plastic is one of a polyether ether ketone and a polyetherketone.

14. The method according to claim 10, wherein the elastomer is made of one of fluorinated hydrocarbons, perfluoroelastomer, polypropylene rubber, and copolymers of tetrafluoroethylene and propylene.

15. The method according to claim 10, wherein the elastomer of the second body portion is bonded to an exterior of the first body portion.

\* \* \* \* \*